(12) United States Patent
Donze et al.

(10) Patent No.: US 6,334,906 B1
(45) Date of Patent: Jan. 1, 2002

(54) METHOD OF OXYGEN CUTTING CONTINUSUSLY CAST BILLETS, AND APPARATUS FOR IMPLEMENTING THE METHOD

(76) Inventors: Michel Donze, La Flie, 54460 Liverdun; Guy Prioretti, 13 rue Alexandre Dreux, 57100 Thionville, both of (FR)

(*) Notice: Subject to any disclaimer, the term of this patent is extended or adjusted under 35 U.S.C. 154(b) by 0 days.

(21) Appl. No.: 09/509,257
(22) PCT Filed: Sep. 28, 1998
(86) PCT No.: PCT/FR98/02070
  § 371 Date: Mar. 24, 2000
  § 102(e) Date: Mar. 24, 2000
(87) PCT Pub. No.: WO99/16570
  PCT Pub. Date: Apr. 8, 1999

(30) Foreign Application Priority Data

Oct. 1, 1997 (FR) ............................................. 97 12210

(51) Int. Cl.[7] .................................................. B23K 7/00
(52) U.S. Cl. ........................ 148/203; 148/200; 266/48; 266/52
(58) Field of Search .............................. 266/48, 50, 52; 148/194, 200, 203, 205

(56) References Cited

U.S. PATENT DOCUMENTS

| | | | | |
|---|---|---|---|---|
| 2,465,297 A | * | 3/1949 | Thompson et al. | 148/197 |
| 2,820,420 A | | 1/1958 | Hayes | |
| 4,336,078 A | * | 6/1982 | Radke | 266/50 |
| 4,405,382 A | * | 9/1983 | Baier et al. | 266/50 |
| 4,923,527 A | * | 5/1990 | Ludwigson | 266/50 |

FOREIGN PATENT DOCUMENTS

| | | |
|---|---|---|
| EP | 0 639 416 A1 | 2/1995 |
| WO | 96 20818 | 7/1996 |

* cited by examiner

*Primary Examiner*—Scott Kastler
(74) *Attorney, Agent, or Firm*—Nixon Peabody LLP; Stuart J. Friedman

(57) ABSTRACT

The invention provides a method and apparatus for oxygen cutting continuously cast billets, in which a cutting member (8) and a trimming member (9) are positioned relative to the billet to be cut (1) by taking a reference directly on the billet (1) by means of a moving clamp (7), after which the cutting member (8) and the trimming member (9) are lowered parallel to the side faces of the billet so as to cut the billet progressively downwards by attacking one of its side faces horizontally, while simultaneously trimming the cutting bead that forms on the other side face by attacking said other side face continuously in a downward direction.

14 Claims, 4 Drawing Sheets

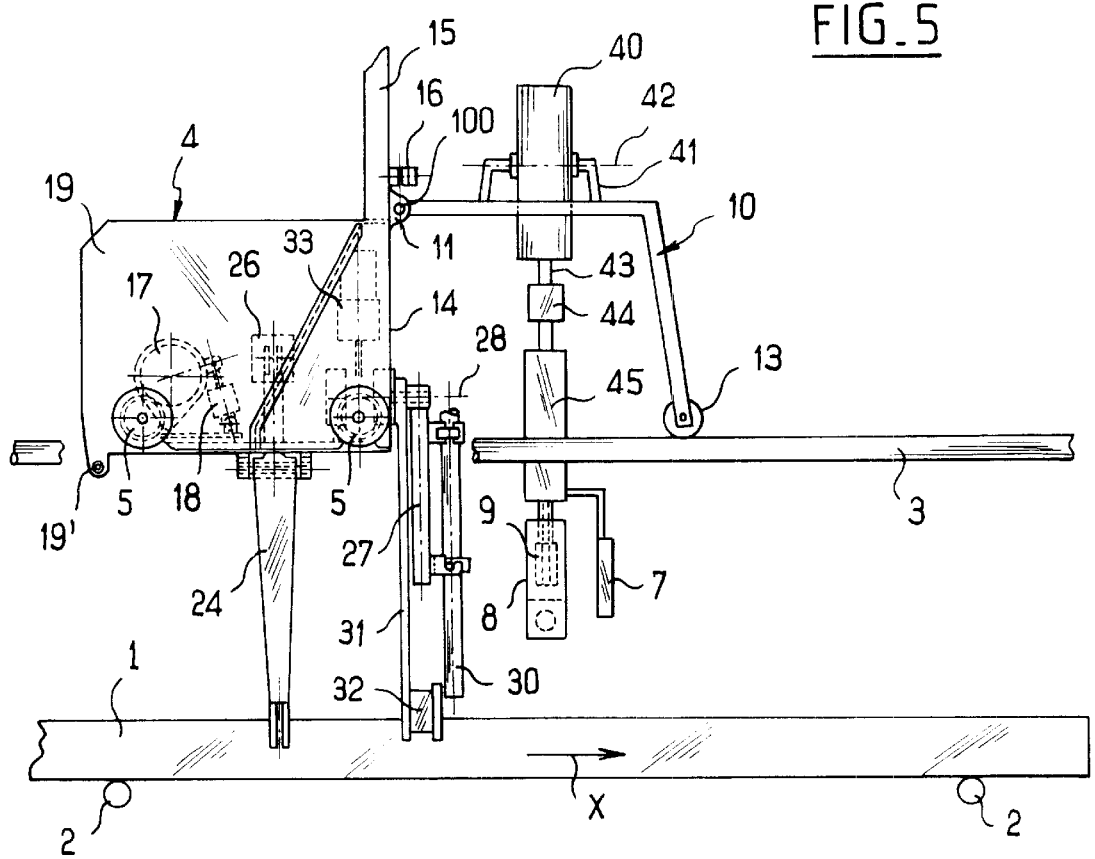
FIG_5
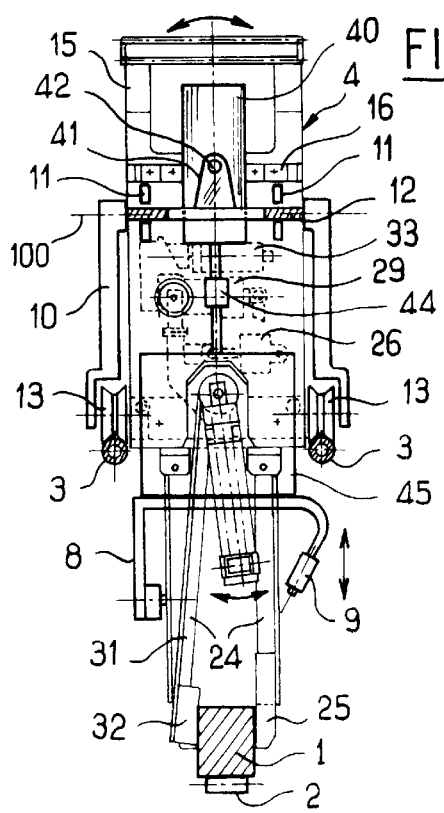
FIG_6
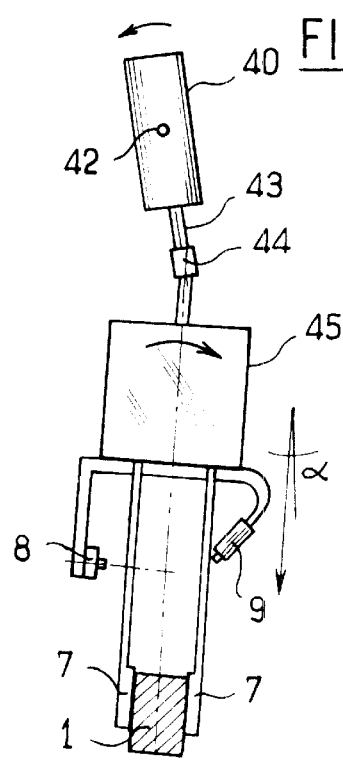
FIG_7

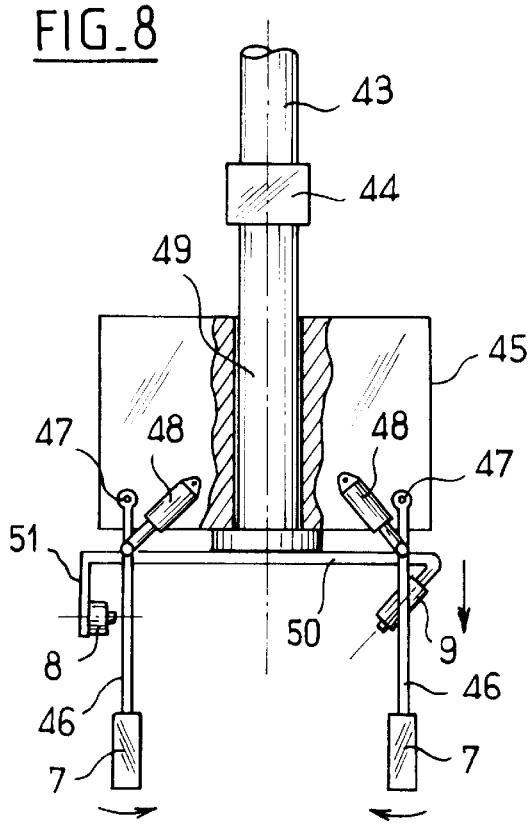
FIG_8
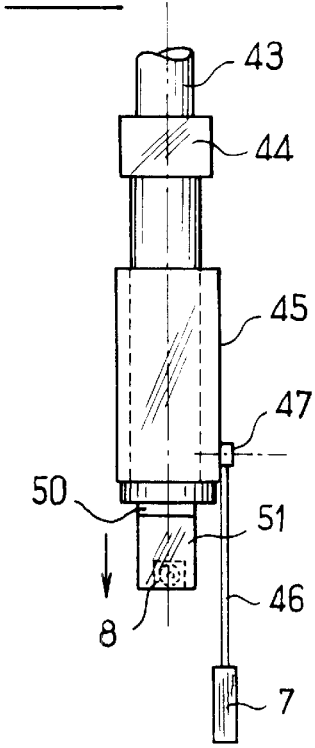
FIG_9
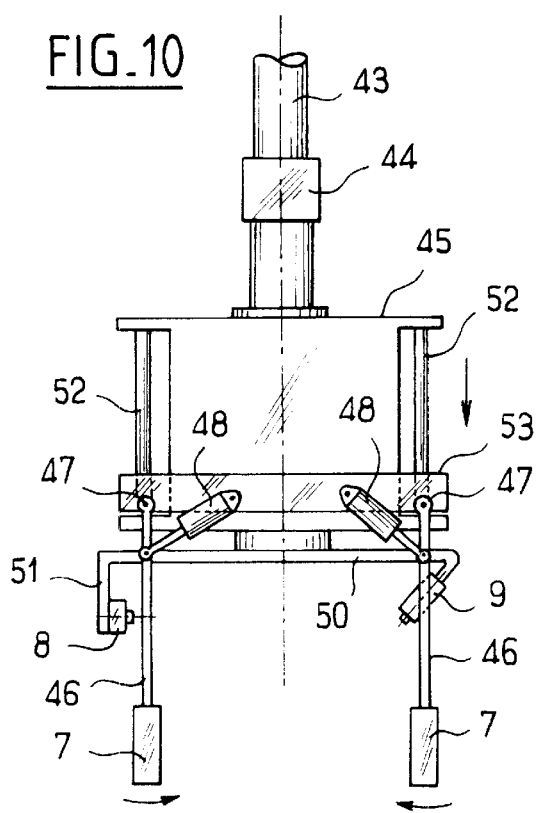
FIG_10
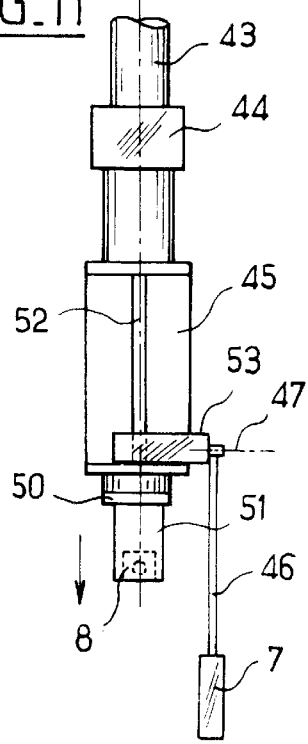
FIG_11

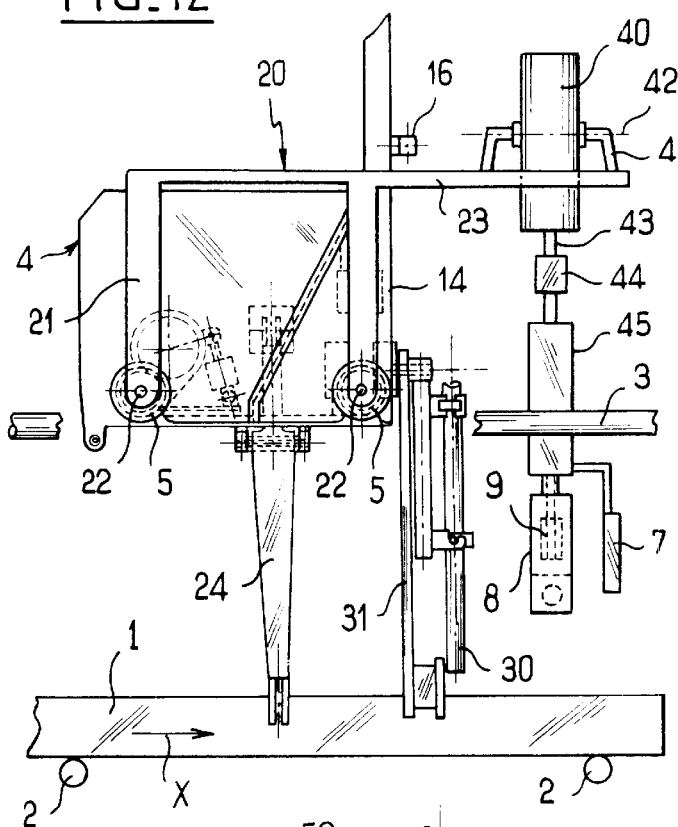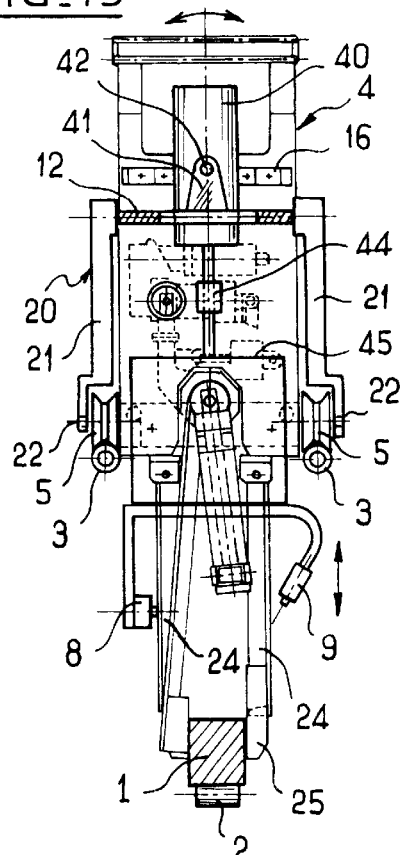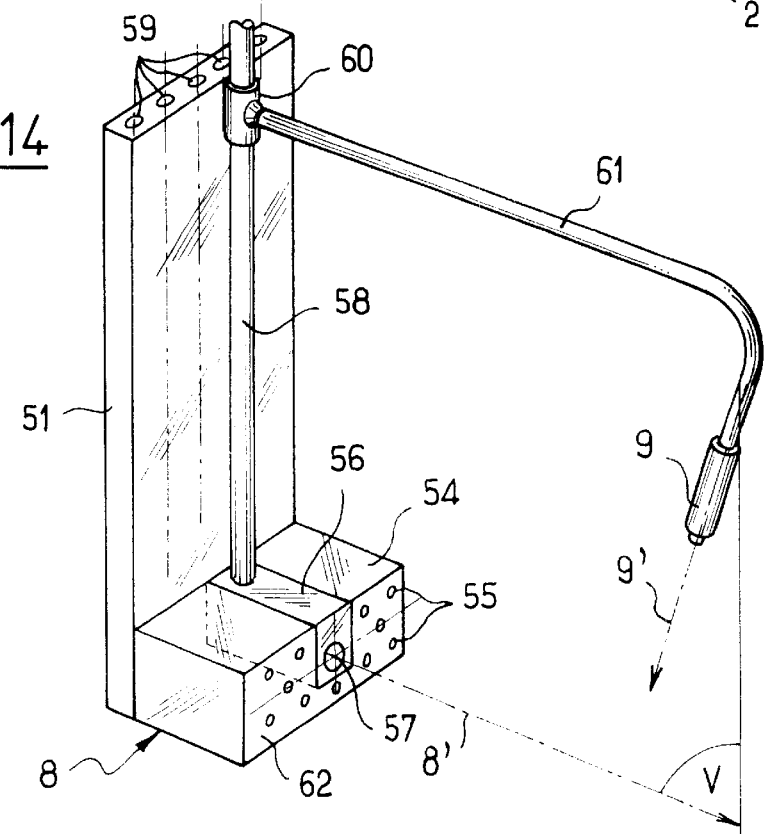

METHOD OF OXYGEN CUTTING CONTINUSUSLY CAST BILLETS, AND APPARATUS FOR IMPLEMENTING THE METHOD

This application is a 371 of PCT/FR98/02070 filed on Sep. 28,1998.

FIELD OF THE INVENTION

The present invention relates to a method and to apparatus for oxygen cutting continuously cast billets.

BACKGROUND OF THE INVENTION

In general, steel working installations for continuously casting billets include oxygen cutting apparatus serving to cut up the billet leaving the casting apparatus into segments for rolling into steel products (round bars, sections, wires, etc . . . ). Conventionally, oxygen cutting apparatuses make use of a carriage that is horizontally displaceable on associated rails passing over the billet to be cut. The carriage has a bottom clamp for taking hold of the moving billet and, ahead of the carriage, a torch carrier together with its torch that is suitable for being made to swing in a vertical plane by associated drive means. The moving carriage is motor-driven, and motor drive is declutched when the clamp is actuated since the carriage is then driven directly by the moving billet. The swinging torch is then put into action and performs oxygen cutting, the cutting oxygen jet passing vertically through the billet from its top face. Thus, while the carriage is moving in translation identically to the billet during the time required for cutting, the billet is cut by the swinging movement of the oxygen cutting torch in a vertical plane. Once the billet has been cut, the carriage is caused to move back and the clamp is actuated again to take hold of the billet further upstream so as to make a new cut. Document EP-A-0 639 416 describes an oxygen cutting installation having two lines, each with its own moving carriage having a respective swinging torch of the type described above.

That type of oxygen cutting technique when applied to continuously cast billets presents three major drawbacks.

The first drawback lies in the formation of molten metal residue on the bottom face of the billet where the oxygen jet leaves it, with this occurring over the entire width of the billet. This rim of molten metal residue mixed with iron oxide remains securely attached to the cut ends and forms a cutting bead which is naturally undesirable. It turns out to be necessary to make provision for an additional operation of removing such residue or beads of greater or lesser size depending on the grade of steel and on the type and adjustment of the torch. This removal is generally performed by trimming, in general by means of a torch. This is a correction operation leading to a cost penalty in billet production.

The second drawback lies in the oxygen cutting jet being used in an unfavorable manner which is a direct consequence of the geometrical motion of the torch whereby it follows a circular arc in a vertical plane while the torch carrier is swinging. The jet travels at a speed that is greater at the bottom face of the billet than it is on the top or "attack" face of said billet, which is unfavorable in energy terms insofar as the cutting oxygen is less energetic at the downstream edge of the cut because it has lost kinetic energy. Unfortunately, the thickness of the cutting bead is a function of the speed of the oxygen cutting jet, such that the bead is automatically very thick if it is desired to cut the billet quickly.

Finally, a third drawback can be mentioned which is failure to accommodate any accidental twisting of the billet (on cooling with certain steels), which twisting gives rise to cutting being inaccurate, and the presence of residue that is necessarily greater in the most twisted zones of the billet.

The technological background is also illustrated by document US-A-2 820 420 which describes an oxygen cutting torch cantilevered out from a horizontally-movable carriage, and by document WO-A-96/20818 which describes a traveling crane supporting a telescopically-extensible vertical working arm.

SUMMARY OF THE INVENTION

The invention seeks to provide an oxygen cutting technique that makes it possible to avoid the above-specified drawbacks.

An object of the invention is thus to provide a method of oxygen cutting continuously cast billets, and apparatus for implementing the method, capable of cutting billets in regular manner without leaving a cutting bead, and to do so with high accuracy and great speed, even in the event of billets being accidentally twisted.

According to the invention, this problem is resolved by a method of Oxygen cutting continuously cast billets, wherein a cutting member and a trimming member are positioned relative to the billet to be cut by taking a reference directly on the billet, and then the cutting member and the trimming member are lowered parallel to the side faces of the billet so as to perform cutting progressively downwards by attacking one of the side faces of the billet horizontally or substantially horizontally, and while simultaneously trimming the cutting bead that forms on the other side face by attacking said other side face constantly in a downward direction.

Thus, by taking a reference directly on the billet, it is guaranteed that an accurate cut will be made which starts on a side face of the billet in a direction that is exactly perpendicular thereto, even if the billet is twisted. When the billet is twisted, the direction of attack is automatically corrected. This makes it possible to achieve genuine "horizontal" cutting with optimum accuracy and speed.

Preferably, the reference is taken directly on the two side faces of the billet, preferably by means of a moving clamp. When the moving clamp has contacted the two side faces of the billet, the direction in which the cutting member and the trimming member move downwards is accurately determined, and it is quite certain that this direction is indeed parallel to the side faces of the billet.

Also advantageously, the reference is taken by lowering a moving clamp quickly, after which cutting and trimming are performed downwards by lowering the corresponding members at a programmed oxygen cutting speed. This optimizes the oxygen cutting process with minimum loss of time for putting the cutting and trimming members into place.

Also preferably, the trimming member is a blow torch nozzle whose jet remains continuously directed downwards while the cutting and trimming members are being lowered.

Thus, the simultaneous trimming performed by action that is constantly directly downwards, in particular by a jet from a nozzle, causes fumes to be removed downwards, which favors normal removal of the fumes, and in addition it avoids causing slag to be splashed sideways as happens conventionally with installations in which the torch is moved with a swinging motion. Thus, for the first time, a horizontal cut can be provided that has no cutting bead and in which trimming is organized downwards.

The invention also provides apparatus for implementing the above oxygen cutting method, the apparatus being of the type comprising a carriage that is horizontally displaceable on associated rails overlying the billet to be cut.

According to the invention, the apparatus further comprises:

an auxiliary structure connected to the moving carriage and supporting a vertical actuator; and a frame suspended from the vertical actuator via a universal joint, said frame supporting both a moving clamp and a cutting member and trimming member that are movable in a vertical or substantially vertical direction as determined by the moving clamp after it has been clamped the billet to be cut, said cutting member acting in a substantially horizontal direction essentially perpendicular to the above-specified displacement direction, and said trimming member acting downwards.

Because of the universal joint, it is possible to move the cutting and trimming members in a direction that slopes relative to the vertical, which direction is automatically given by the reference being taken by means of the moving clamp.

Preferably, the vertical actuator is a piston-and-cylinder or an electric motor, with the body thereof being floatingly mounted on the auxiliary structure, being capable at least of pivoting about a horizontal axis parallel to the travel direction of the carriage. This avoids any risk of jamming for the assembly which is moved in a vertical plane for cutting the billet horizontally.

In a particular embodiment, the auxiliary structure is mounted via one end to the front of the carriage so as to be pivotable about a horizontal axis, and rests via its other end on the same rails as the carriage.

In a variant, provision can be made for the auxiliary structure to be mounted laterally on the running axles of the carriage, and to be extended forwards by a cantilevered-out portion which supports the vertical actuator.

The cutting member and the trimming member can be connected to the frame in various different ways providing the sliding direction of the cutting and trimming members complies with the direction given by the reference taken by means of the moving clamp.

Thus, it is possible to provide for the cutting member and the trimming member to be connected to a central slide passing through the frame, and for the moving clamp to be hinged on said frame.

In a variant, provision can be made for the cutting member and the trimming member to be connected to the frame, and the moving clamp to be hinged to a secondary structure capable of sliding vertically on said frame. In which case, the secondary structure can be connected to the frame by an actuator for lowering the clamp.

Preferably, the cutting member comprises a horizontal burner having an incorporated nozzle block. It is then advantageous for the nozzle block with its cutting oxygen feed pipe to form a removable assembly.

Also advantageously, the trimming member is a nozzle fed with oxygen, and mounted in such a manner that its jet is directed downwards. In which case it is preferable for the trimming nozzle to be fed with the cutting oxygen or the heating oxygen as fed to the cutting member via an associated branch connection.

DESCRIPTION OF THE DRAWINGS

Other characteristics and advantages of the invention will appear more clearly in the light of the following description and the accompanying drawings relating to a particular embodiment and referring to the figures in which:

FIG. 5 is an elevation view of apparatus for implementing the method of the invention, with a wheelbarrow-mounted oscillating auxiliary structure;

FIG. 6 shows the same apparatus seen end-on;

FIG. 7 is a view analogous to FIG. 6, but simplified, showing how a reference is taken on a twisted billet, thereby causing the sliding direction of the cutting and trimming members to be tilted;

FIGS. 8 and 9 are two views showing the frame supporting the moving clamp and the cutting and trimming members, in a system having a central slide;

FIGS. 10 and 11 are two views analogous to the preceding figures, showing a variant using a secondary structure capable of sliding vertically on the frame;

FIGS. 12 and 13 show a variant embodiment with an auxiliary structure mounted laterally on the running axles of the carriage, on both sides thereof; and FIG. 14 is a fragmentary perspective view showing in greater detail the cutting and trimming members together with the removable functional assembly comprising the oxygen cutting nozzle block with its pipe for feeding cutting oxygen, the trimming nozzle being likewise fed with oxygen, in this case from a branch connection to said pipe.

DESCRIPTION OF THE PREFERRED EMBODIMENTS

Figure 1:
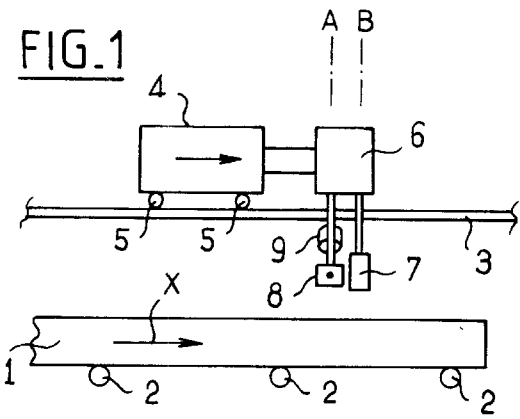
FIGS. 1, 1A, 1B, 2, 2B, 3, 3A, 4A and 4 are diagrams showing a method of oxygen cutting continuously cast billets in accordance with the invention with, for the elevation view of FIG. 1 and the section views of FIGS. 1A and 1B (respectively on planes A and B in FIG. 1), the oxygen cutting apparatus being put into place above the billet to be cut, and then in FIGS. 2 and 2B the reference being taken by means of a moving clamp which surrounds the billet, then for FIGS. 3 and 3A the cutting and trimming members being lowered so as to come level with the top face of the billet to be cut, and finally for FIGS. 4 and 4A the cutting process being at an intermediate level of the billet, with this simultaneous cutting and trimming continuing downwards through the entire thickness of the billet.
Figures 1A, 1B:
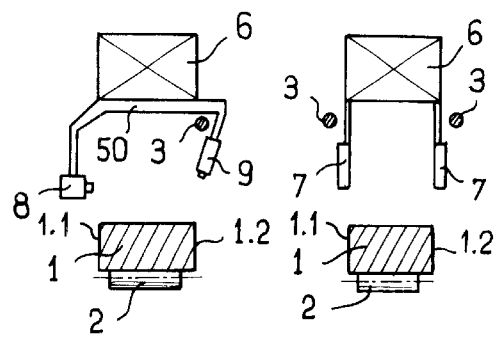

FIG. 1 shows a continuously cast billet 1 moving horizontally on rolls 2 in the direction marked X. A pair of horizontal rails 3 is organized over the moving billet to serve as a support for a moving carriage 4 which runs on the rails 3 via associated wheels 5. The carriage 4 has a structure 6 fitted underneath with a moving clamp 7, and with a cutting member 8 and a trimming member 9 in a vertical plane that is offset from that of the moving clamp (in this case behind said plane). FIGS. 1A and 1B are section views in vertical planes marked A and B in FIG. 1. In FIG. 1B, there can thus be seen the two elements or arms of the moving clamp 7, intended to make contact with the side faces 1.1 and 1.2 of the billet 1 for preliminary reference taking. In FIG. 1A, there can be seen the equipment comprising the cutting member 8 and the trimming member 9 carried by a common support 50. In FIGS. 1B and 1A, both the moving clamp 7 and the equipment comprising the cutting member 8 and the trimming member 9 are in the high position.

Figure 2:
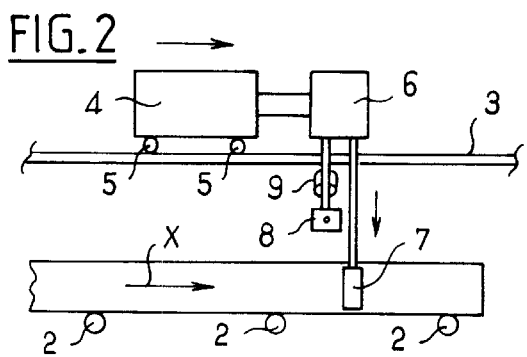
Figure 2B:
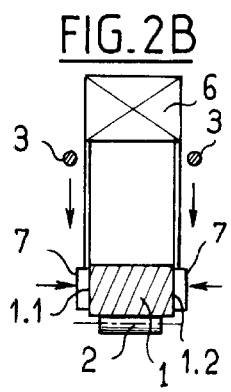

FIGS. 2 and 2B show the moving clamp being lowered (represented by arrows), with the ends of the clamp taking hold of the sides of the billet 1, in this case by making direct contact with the side faces 1.1 and 1.2 thereof. The equipment that includes the cutting member 8 and the trimming member 9 is still in the high position. The assembly that runs on the rails 3 is then attached to the moving billet 1 by the clamp 7 closing, said billet then directly driving the running assembly. It is important to observe that in the event of the billet being accidentally twisted, the side faces 1.1 and 1.2 slope slightly relative to the vertical, thereby automatically causing the equipment constituted by the cutting member 8 and the trimming member 9 to be tilted correspondingly, such that said equipment is always lowered parallel to the side faces of the billet to be cut.

Figure 3:
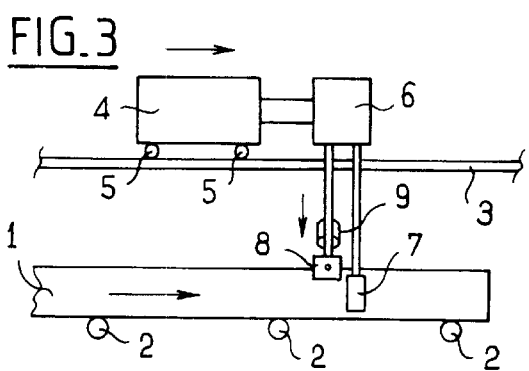
Figure 3A:
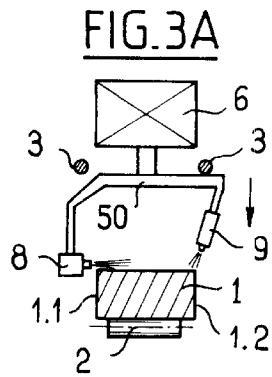

In FIGS. 3 and 3A, the equipment constituted by the cutting member 8 and the trimming member 9 has begun to be lowered, and the cutting member 8 hag begun its cutting action while the trimming member 9 is simultaneously attacking the opposite side face 1.2 so as to eliminate the cutting bead or residue forming thereon. Oxygen cutting of the billet 1 then continues with the cutting and trimming members 8 and 9 moving downwards progressively.

Figure 4:
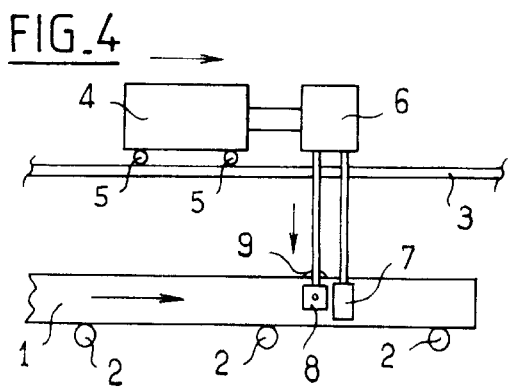
Figure 4A:
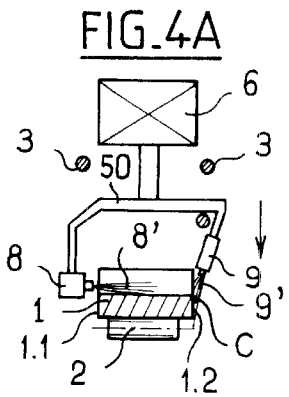

FIGS. 4 and 4A thus show an intermediate position, and in FIG. 4A the cutting jet 8' coming from the cutting member 8 can be seen, which jet extends horizontally or substantially horizontally. The trimming jet 9' coming from the trimming member 9 can also be seen, which member is constituted, for example, by a blow torch nozzle, with its jet being downwardly directed (preferably sloping a little relative to the vertical). The action of the trimming jet 9' serves not only to eliminate the cutting bead, but also to exert extremely favorable action by directing the fumes downwards while simultaneously preventing any slag being sprayed sideways. The cutting member 8 and the trimming member 9 can thus continue to move downwards until the billet has been cut right through. Thereafter, it suffices to release the clamp 7, and to raise said clamp together with the cutting and trimming members. The carriage 4 can then be put back into motion to return it rearwards into a new cutting position, and the oxygen cutting cycle on the billet can then be repeated.

As shown in FIGS. 2 and 2B, the cutting member 8 and the trimming member 9 are positioned relative to the billet for cutting by taking a reference directly from the billet (in this case from its two side faces 1.1 and 1.2), by means of the moving clamp 7, after which the cutting member 8 and the trimming member 9 are lowered parallel to the side faces 1.1 and 1.2 of the billet so as to cut through it progressively downwards by attacking one of the side faces 1.1 of the billet horizontally or substantially horizontally, and while simultaneously trimming the cutting bead referenced C that forms on the other side face 1.2 by directing an attack on this other side face 1.2 in a direction that is constantly downwards.

To optimize the oxygen cutting stage while reducing the time required for the process, it is possible to provide for the reference to be taken by lowering the moving clamp 7 quickly, after which the downward cutting and trimming can be performed by lowering the corresponding members 8 and 9 at a programmed cutting speed. The trimming member 9 is preferably a blow torch nozzle whose jet 9' is directed downwards constantly while the cutting and trimming members 8 and 9 are being lowered.

FIGS. 5 and 6 show apparatus for implementing the above-described oxygen cutting method.

In these more detailed drawings, there can be seen the moving carriage 4 which is of conventional design (with the equipment specific thereto being described below). In accordance with a characteristic of the invention, the carriage 4 is fitted with an auxiliary structure 10 which is connected thereto and which supports an actuator 40. Specifically, the auxiliary structure 10 has one end mounted on the front of the carriage 4 via lugs 11, allowing it to pivot about a horizontal axis 100. The other end of the auxiliary structure 10 rests on the same rails 3 as the carriage, via associated wheels 13. The auxiliary structure 10 has a central panel 12 carrying two brackets 41 which support the vertical actuator 40 so as to constitute a floating mount therefor. Specifically, it is shown as being mounted to tilt about a horizontal axis 42 lying substantially in the vertical midplane of the carriage. The vertical actuator 41 can be a piston-and-cylinder or an electric motor, with its body being mounted to move relative to the auxiliary structure 10. The vertical actuator 40 passes through the central panel 12 and its bottom end is fitted with an outlet rod 43 provided with an intermediate universal joint 44. A frame 45 is suspended from the vertical actuator 40 via the outlet rod 43, said frame supporting both the moving clamp 7 and the cutting member 8 together with the trimming member 9 which are movable in a vertical or substantially vertical direction as determined by the moving clamp 7 after it has clamped onto the billet to be cut. The cutting member 8 can then act in a substantially horizontal direction which is essentially perpendicular to the above-specified displacement direction, while the trimming member 9 always acts downwards. The cutting member 8 and the trimming member 9 are lowered with very great accuracy because of the two references taken: firstly the height reference as given by the wheels 13 bearing directly on the running rails 3, and secondly the angle reference given by the contact between the side faces of the billet and the two jaws of the moving clamp 7.

FIG. 7 shows the position of the above-specified members in the event of the billet 1 being accidentally twisted (by a small angle α relative to the vertical). As can be seen, the floating mount of the vertical actuator 40 and the presence of the intermediate universal joint 44 makes it possible for the equipment constituted by the cutting member 8 and the trimming member 9 to be lowered normally in the desired direction. Oxygen cutting is thus performed extremely accurately insofar as the attack directions of the cutting jet and of the trimming jet always remain the same relative to the side faces of the billet, with this continuing to be the case all along the cut which is performed downwards, and regardless of whether or not the billet to be cut is accidentally twisted.

A first type of mount for the moving clamp 7 and for the cutting and trimming members 8 and 9 relative to the frame 45 is shown in FIGS. 8 and 9.

In this case, the cutting member 8 and the trimming member 9 are fixed to a common support 50 secured to a central slide 49 passing through the frame 45, substantially in the center thereof, with the slide 49 being connected to the universal joint 44. The two arms 46 of the moving clamp 7 are hinged at 47 directly to the frame 45, and they are moved by associated control actuators 48. 51 designates the manifold block supporting the cutting member 8, which block is described in greater detail below with reference to FIG. 14. In this case, the effect of actuating the vertical actuator 40 is to lower the frame 45 together with the elements it supports until a reference has been taken by the ends of the moving clamp 7. Thereafter, once the reference has been taken by clamping against the two side faces of the billet, the frame 45 ceases to move downwards, and it is then the slide 49 which moves downwards on its own together with the cutting and trimming members 8 and 9 to perform the process of cutting the billet.

FIGS. 10 and 11 show another possible variant, in which the cutting member 8 and the trimming member 9 are connected to the frame 45 by a support 50 that is rigidly secured thereto, while the moving clamp 7 is hinged on a secondary structure 53 capable of sliding vertically relative to said frame. For this purpose, the frame 45 has two vertical columns 52 disposed on either side of the frame, said columns serving as guides to guide the sliding movement of the secondary structure 53 which is U-shaped (in a horizontal plane) together with the arms 46 of the moving clamp 7 which are hinged at 47 to the moving structure 53, and associated with actuators 48 that move the arms so as to take the preliminary reference, or so as to disengage them after the cutting process has been terminated.

In this case, the assembly suspended from the universal joint 44 is lowered progressively until the moving clamp 7 has taken its reference, after which the frame 45 and the cutting and trimming members 8 and 9 continue to move downwards while the secondary structure 53 remains stationary over the billet to be cut. In this embodiment, the actuator means 40 can be controlled in entirely electrical manner, firstly performing a preliminary approach stage to take the reference by clamping onto the billet to be cut, followed by the oxygen cutting process whose cutting speed is programmed in advance.

In a variant, provision can be made for the secondary structure 53 to be connected to the frame 45 by an actuator for lowering the clamp (not shown). In which case, during the preliminary approach stage, the clamp-lowering actuator is actuated on its own, with the frame 45 then remaining stationary. Thereafter, the frame 45 and the cutting and trimming members 8 and 9 are lowered for the cutting process proper.

FIGS. 12 and 13 show a variant which can be envisaged if sufficient space is available on either side of the moving carriage 4.

In this case, the auxiliary structure referenced 20 is mounted laterally on the running axles 22 of the carriage 4, said auxiliary structure being extended forwards by a cantilevered-out portion referenced 23 which supports the actuator 40, the members carried by the cantilevered-out portion being identical to those of the preceding embodiment. There is therefore no longer the reference provided by a wheelbarrow-structure bearing directly on the running rails as described above, but instead the assembly is mounted directly on the running axles of the carriage. This configuration can be simpler, but it suffers from the drawback of being cantilevered out to a considerable extent, thereby requiring the equipment that runs on the rails to be balanced appropriately.

FIG. 14 shows an advantageous embodiment of the cutting and trimming members 8 and 9.

The cutting member 8 has a horizontal burner 54 cantilevered out on a manifold block 51 which is secured to the above-mentioned support 50 that is suspended from the actuator 40. The manifold block 51 is preferably made of stainless steel, and it is pierced by a plurality of vertical channels 59 machined in the body thereof so as to convey the heating oxygen, the fuel gas, and the go-and-return circuit for cooling water. The horizontal burner 54 has ducts (not shown) for feeding the various gaseous fluids and also for cooling by circulating water. The horizontal burner 54 is fitted with an incorporated nozzle block 56. Adjacent to the outlet face 62, there can be seen the outlet orifice 57 of the oxygen cutting nozzle, together with a plurality of outlet orifices 55 for heating oxygen and for fuel gas, these orifices surrounding the outlet orifice of the nozzle. The nozzle carrying block 56 is fed with cutting oxygen by a pipe 58 which in this case is separate (i.e. not part of the manifold block 51) so that the pipe 58 and the nozzle block 56 form a removable assembly. This makes it possible for the assembly which constitutes the core of the oxygen cutting apparatus to be replaced very quickly.

The trimming member 9 is constituted by a nozzle fed with oxygen and mounted in such a manner that its jet 9' is directed downwards. It will be observed that the cutting jet 8' and the trimming jet 9' lie in the same vertical plane V, and that this remains true throughout the entire process of cutting the billet. The trimming nozzle 9 can be fed with cutting oxygen or with heating oxygen as fed to the cutting member 8. Specifically, it is shown as being fed with cutting oxygen via an associated branch connection 61 which taps into the cutting oxygen feed pipe 58 via a T-member 60. In a variant, it could tap into the heating oxygen feed duct in the manifold block 51, in which case it would be appropriate to provide an adjustment cock. Naturally, a separate feed could be provided for the trimming nozzle 9, thus providing greater flexibility in the corresponding installation, particularly given that the ability to position the trimming nozzle helps reduce its requirements in trimming oxygen.

Another advantage of the invention lies in the fact that the apparatus as described above can easily be fitted to a conventional oxygen cutting carriage, as shown in FIGS. 5, 6 and 12, 13.

The carriage 4 is thus fitted in conventional manner with a clamp 24 for gripping the billet 1 via shoes 25, with the arms of the clamp being actuated by an associated actuator 26. There can also be seen a drive system 17 which can be brought into engagement with one of the running wheels 5 by means of an actuator 18 so as to drive displacement of the carriage 4 on the rails 3. Finally, at its front, the carriage 4 also has both an arm 31 terminated by a feeler 32 for positioning the start of the cutting cycle, and an oscillating support 27 mounted to swing about a central horizontal axis 28 under the control of an associated actuator 33, with the support 27 being fitted with a swinging torch 30 of conventional type. There can also be seen the actuator 29 for actuating the feeler 32 prior to starting a cutting cycle. The carriage 4 is also fitted with a cover 19 capable of pivoting on a rear axis 19', and a hose support 15 fitted with a rack 16 for securing the feed hoses (not shown). The figures show that the apparatus of the invention is disposed in front of the swinging torch 30, thereby making it possible to add it to an existing installation without requiring any disassembly. In addition, it is possible, by means of an associated set of electrically controlled valves, to change over immediately to performing cutting by means of the swinging torch, merely by stopping the horizontal oxygen cutting system: this makes it possible to avoid stopping a continuous casting line. In a variant, provision can also be made for the apparatus of the invention to be mounted between the clamp system 24 and the swinging torch 30. Although such a configuration is doubtless more complex to implement, it makes it possible to limit the forward size of the carriage, should that be critical in a given environment.

A technique of oxygen cutting continuously cast billets has thus been provided which is both accurate and fast, while simultaneously performing cutting without a bead, and doing so without any need to be concerned about possible accidental twisting of the billet to be cut. In addition, the apparatus is robust and reliable in a hostile environment, and it enables the cutting nozzle to be changed very quickly without interrupting production on the line.

The invention is not limited to the embodiments described above, but on the contrary covers any variant using equivalent means to reproduce the essential characteristics specified above.

What is claimed is:

1. A method of oxygen cutting continuously cast billets, wherein a cutting member (8) and a trimming member (9) are positioned relative to a billet to be cut (1) by taking a reference directly on two side faces of said billet by lowering a moving clamp, and then the cutting member (8) and the trimming member (9) are lowered parallel to the side faces (1.1, 1.2) of the billet so as to perform cutting progressively downwards by attacking one of the side faces (1.1) of the billet horizontally or substantially horizontally, and while simultaneously trimming the cutting bead (C) that forms on the other side face (1.2) by attacking said other side face constantly in a downward direction.

2. A method according to claim 1, wherein the reference is taken by lowering said moving clamp (7) quickly, after which cutting and trimming are performed downwards by lowering the corresponding members (8, 9) at a programmed oxygen cutting speed.

3. A method according to claim 1, wherein the trimming member (9) is a blow torch nozzle whose jet remains continuously directed downwards while the cutting and trimming members (8, 9) are being lowered.

4. Apparatus for oxygen cutting continuously cast billets, the apparatus comprising a carriage (4) that is horizontally displaceable on associated rails (3) overlying the billet (1) to be cut, the apparatus comprising:

an auxiliary structure (10, 20) connected to the moving carriage (4) and supporting a vertical actuator (40); and a frame (45) suspended from the vertical actuator (40) via a universal joint (44), said frame supporting both a moving clamp (7) that is movable in a substantially vertical direction, and a cutting member (8) and trimming member (9) that are movable independently from said moving clamp in a substantially vertical direction as determined by said moving clamp (7) after it has been clamped to the billet to be cut, said cutting member (8) acting in a substantially horizontal direction, and said trimming member (9) acting downwards.

5. Apparatus according to claim 4, wherein the vertical actuator (40) is a piston-and-cylinder or an electric motor, with the body thereof being floatingly mounted on the auxiliary structure (10, 20), being capable at least of pivoting about a horizontal axis (42) parallel to the travel direction of the carriage.

6. Apparatus according to claim 4, wherein the auxiliary structure (10) is mounted via one end to the front of the carriage (4) so as to be pivotable about a horizontal axis (100), and rests via its other end on the same rails as the carriage.

7. Apparatus according to claim 4, wherein the auxiliary structure (20) is mounted laterally on the running axles (22) of the carriage (4), and is extended forwards by a cantilevered-out portion (23) which supports the vertical actuator (40).

8. Apparatus according to claim 4, wherein the cutting member (8) and the trimming member (9) are connected to a central slide (49) passing through the frame (45), and the moving clamp (7) is hinged on said frame.

9. Apparatus according to claim 4, wherein the cutting member (8) and the trimming member (9) are connected to the frame (45), and the moving clamp (7) is hinged to a secondary structure (53) capable of sliding vertically on said frame.

10. Apparatus according to claim 9, wherein the secondary structure (53) is connected to the frame (45) by an actuator for lowering the clamp.

11. Apparatus according to claim 1, wherein the cutting member (8) comprises a horizontal burner (54) having an incorporated nozzle block (56).

12. Apparatus according to claim 11, wherein the nozzle block (56) with its cutting oxygen feed pipe (58) forms a removable assembly.

13. Apparatus according to claim 4, wherein the trimming member (9) is a nozzle fed with oxygen, and mounted in such a manner that its jet (9') is directed downwards.

14. Apparatus according to claim 13, wherein the trimming nozzle (9) is fed with the cutting oxygen or the heating oxygen as fed to the cutting member (8) via an associated branch connection (61).

* * * * *